United States Patent

[11] 3,588,247

| [72] | Inventor | Koji Noda<br>Sakai, Japan |
|---|---|---|
| [21] | Appl. No. | 728,283 |
| [22] | Filed | May 10, 1968 |
| [45] | Patented | June 28, 1971 |
| [73] | Assignee | Minolta Camera Kabushiki Kaisha<br>Osaka, Japan |
| [32] | Priority | May 17, 1967 |
| [33] | | Japan |
| [31] | | 42/31,372 |

[54] AUTOMATIC EXPOSURE CONTROL DEVICE FOR COPYING MACHINE
9 Claims, 3 Drawing Figs.

[52] U.S. Cl. ..................................................... 355/69, 355/83
[51] Int. Cl. ...................................................... G03b 27/26
[50] Field of Search .......................................... 355/69, 67, 68, 71, 83

[56] References Cited
UNITED STATES PATENTS
3,397,611  8/1968  Davis............................ 355/68
2,614,453  10/1952  MacArthur.................... 355/83(X)
3,279,312  10/1966  Roger, Jr. ..................... 355/68(X)
3,349,684  10/1967  Lode............................. 355/68(X)

*Primary Examiner*—Samuel S. Matthews
*Assistant Examiner*—Richard L. Moses
*Attorney*—Prangley, Clayton, Mullin, Dithmar and Vogel ABSTRACT: The exposure mechanism in a copying machine has associated therewith a memory element which is determinative of the quantity of light exposed to a photosensitive copying medium. A bridge circuit contains a variable resistance element and a photosensitive element, the resistance of which changes with the optical properties of an original to be copied. A reversible motor operates to vary the values of both the memory element and the variable resistance element when there is an imbalance in the bridge circuit, the direction of which variations being determined by the polarity of the imbalance. When the bridge circuit is balanced by changing the resistance presented by the variable resistance element, the motor ceases to operate, thereby establishing the value of the memory element and thus the quantity of light to be exposed to the photosensitive copying medium.

INVENTOR
KOJI NODA

AUTOMATIC EXPOSURE CONTROL DEVICE FOR COPYING MACHINE

This invention relates to an automatic exposure control device for copying machines, more particularly to such a device as comprising a measuring means to determine the transmittivity or reflectance of an original to be copied, a control means to determine the proper degree of exposure corresponding to the thus determined transmittivity or reflectance, and an exposing means to expose a photosensitive copying medium to that quantity of light from said original which corresponds to said degree of exposure.

Generally speaking, in copying machines, the quantity of light to be exposed to a photosensitive copying medium, such as a photosensitive paper, should be properly set, depending on the condition of an original to be copied. In the case that the photosensitive medium is exposed to light beams penetrating through the original, the transmittivity of the original should be known, while if the photosensitive copying medium is exposed to light beams reflected from the original, the reflectance of the original should be known. The degree of exposure for the photosensitive medium should be determined, considering such transmittivity or reflectance.

The degree of exposure for the photosensitive medium can be modified either by regulating the duration of exposing the photosensitive copying medium to light beams of constant intensity, or by modifying the intensity of light beams to the photosensitive copying medium while keeping a constant exposure time or duration of exposure.

An object of the present invention is to provide an automatic control device capable of giving the optimum degree of exposure by either varying the duration of exposure or by varying the intensity of light beams, depending on the transmittivity or reflectance of each original to be copied. In a preferred embodiment, however, the brightness of a light source or the intensity of light beams therefrom is kept constant, while the duration of exposure or exposure time is controlled by regulating the feeding speed of a photosensitive copying medium with an original overlaid thereon, so that the quantity of light penetrating through the original can be controlled to a proper value corresponding to the transmittivity of the original.

Other objects and a fuller understanding of the present invention may be had by referring to the following description, taken in conjunction with the accompanying drawings, in which.

Like parts are designated by like numerals and symbols throughout the drawings.

Figure 1:
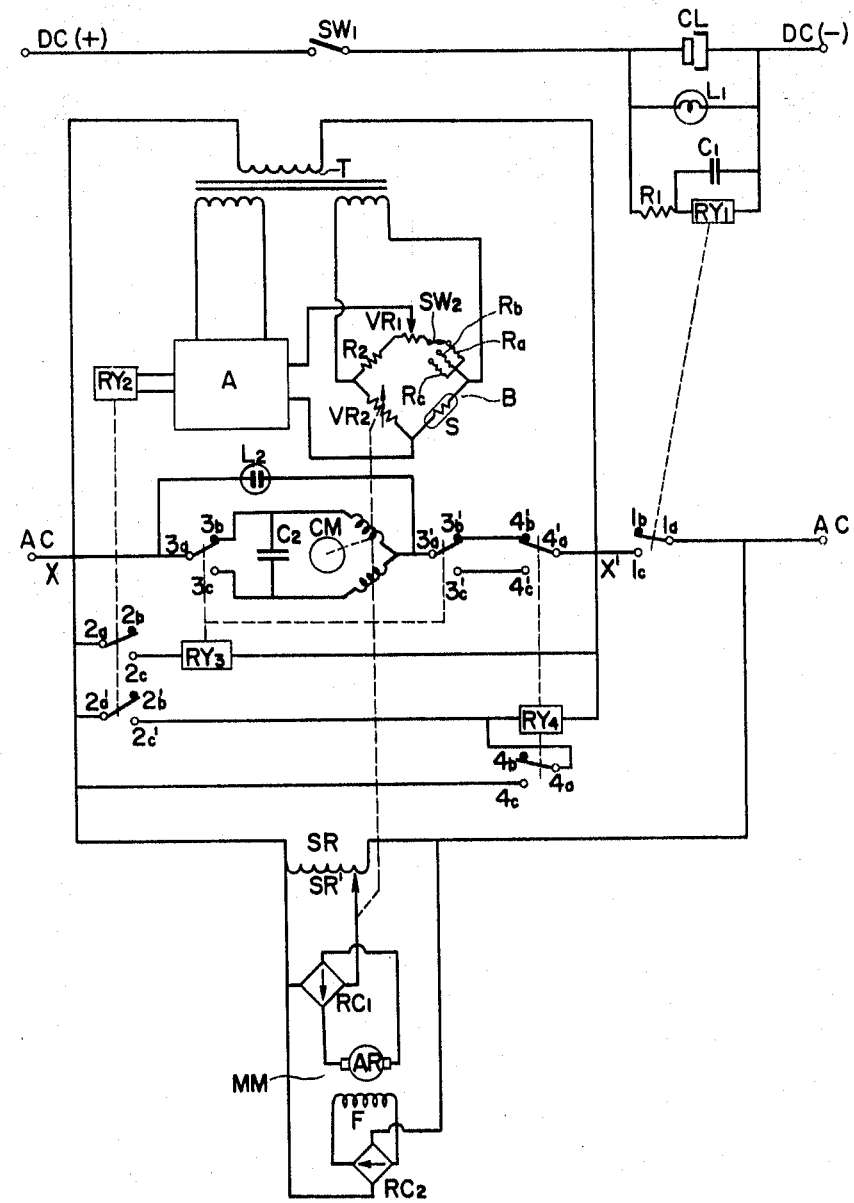
FIG. 1 is a circuit diagram of an automatic exposure control device, according to the present invention.

The circuit diagram of FIG. 1 includes a measuring means to determine the transmittivity of each original and an exposure control portion. The measuring portion has a microswitch $SW_1$ to be closed upon insertion of an original into a transmittivity measuring mechanism, so as to actuate the entire exposure control means of the circuit. A magnetic clutch CL is connected in series with the microswitch $SW_1$, and a DC voltage is applied across the magnetic clutch CL from DC terminals DC(+) and DC(−) through the microswitch $SW_1$, so that the clutch CL is engaged and disengaged depending on whether the microswitch $SW_1$ is closed or open. A measuring light source lamp $L_1$ and a DC relay $RY_1$ are connected in parallel with the clutch CL, respectively, so that the lamp $L_1$ and the relay $RY_1$ are energized and deenergized depending on whether the microswitch is closed or open. A time delay element having a resistor $R_1$ and a capacitor $C_1$ is connected to the DC relay $RY_1$, to delay the energization of the relay from the closure of the microswitch $SW_1$ by a certain time period.

The measuring means also includes an AC bridge circuit B connected to a power transformer T, which bridge circuit B consists of a photosensitive element S, e.g. an element made of CdS, constant value resistors $R_2$, $R_a$, $R_b$, $R_c$, an exposure regulating variable resistor $VR_1$, a potentiometer $VR_2$ for feedback control, and a selective switch $SW_2$ for selectively connecting one of the resistors $R_a$, $R_b$, and $R_c$ to the bridge. The output from the bridge circuit B is connected to an amplifier A, which is also actuated by the power transformer T and consists of an AC amplifying stage and a phase discriminating stage. Another DC relay $RY_2$ is connected to the amplifier A, so as to be selectively energized thereby.

The bridge B, the amplifier A, and the relay $RY_2$ are in such relation that the relay $RY_2$ is controlled in the following manner. For simplicity of description, let it be assumed that the resistor $R_a$ is connected to the bridge B by the selection of the switch $SW_2$, and that the resistance values of the resistors $R_2$, $R_a$, the potentiometer $VR_2$, and the photosensitive element S are represented by $r_2$, $r_a$, $r_c$, and $r_s$, respectively. Then, the relay $RY_2$ is OFF or deenergized under the following condition.

$(r_2/r_c) \geq (r_a/r_s)$, namely $r_s \geq (r_a/r_2)r_c$

On the other hand, the relay $RY_2$ is ON or energized under the following condition.

$(r_2/r_c) < (r_a/r_s)$, namely $r_s < (r_a/r_2)r_c$

The DC relay $RY_2$ has a pair of normally closed contacts $2b$, $2b'$, and another pair of normally open contacts $2c$, $2c'$. The normally open contact $2c$ is connected in series with an AC relay $RY_3$, which has a pair of normally closed contacts $3b$, $3b'$, and another pair of normally open contacts $3c$, $3c'$. The normally open contact $2c'$ of the $RY_2$ is connected to another AC relay $RY_4$, which has a pair of normally closed contacts $4b$, $4b'$ and pair of normally open contacts $4c$, $4c'$. The AC relays $RY_3$ controls the revolving direction of a reversible motor or a condenser motor CM, which is connected to a pilot lamp $L_2$ indicating the revolving direction thereof and a capacitor $C_2$. The reversible motor CM is mechanical linked with the potentiometer $VR_2$ and a variable output voltage transformer SR, in such manner that, when the normally closed contact $3b$ of the $RY_3$ is kept closed, the reversible motor is rotated in one direction to increase the resistance value $r_c$ of the potentiometer $VR_2$ and to reduce the output voltage from the transformer SR. While the normally open contact $3c$ of the relay $RY_3$ is closed, the reversible motor CD is rotated in the opposite direction to reduce the resistance value $r_c$ of the potentiometer $VR_2$ and to increase the output voltage of the transformer SR.

A feeding means, for feeding a photosensitive copying medium, in conjunction with an original, has a DC motor MM consisting of an armature AR and a field winding F. The armature AR is energized by the output from a full wave rectifier $RC_1$, which is energized by the output from the variable output voltage transformer SR. The field winding F is actuated by another full wave rectifier $RC_2$, which is energized by an AC power source.

Figure 2:
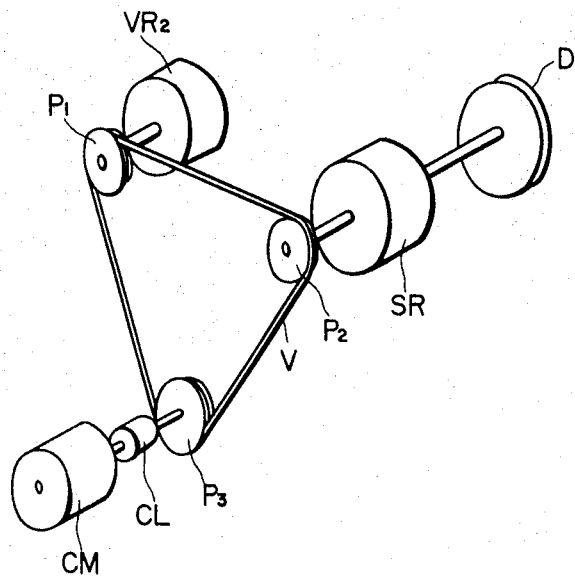
FIG. 2 is a diagrammatic illustration of a driving mechanism of photosensitive media.

FIG. 2 shows the mechanical connection among the reversible motor CM, the potentiometer $VR_2$, and the variable output voltage transformer SR. A pulley $P_3$ is connected to the shaft of the reversible motor CM through the magnetic clutch CL inserted therebetween. The potentiometer $VR_2$ has a pulley $P_1$ secured to the shaft thereof, while the variable output voltage transformer SR has a shaft including a pulley $P_2$ secured thereto. The pulleys $P_1$, $P_2$, and $P_3$ are interconnected with each other by an endless belt V, so that the resistance value $r_c$ of the potentiometer $RV_2$ and the output voltage from the transformer SR are changed in the aforesaid manner, responsive to the rotation of the reversible motor CM.

An indicator dial D is secured to the shaft of the variable output voltage transformer SR, so as to set manually revolving speed of the DC motor MM for feeding the original and the photosensitive medium. When the magnetic clutch CL is actuated, both the rotation of the reversible motor CM and the setting on the dial D can be transmitted to the related elements. If the setting on the dial D can be transmitted to the reversible motor CM through the shaft of the motor CM, then the magnetic clutch CL can be dispensed with. If such transmission of the setting of the dial D is difficult, the input and the output shafts of the magnetic clutch CL may be separated.

Figure 3:
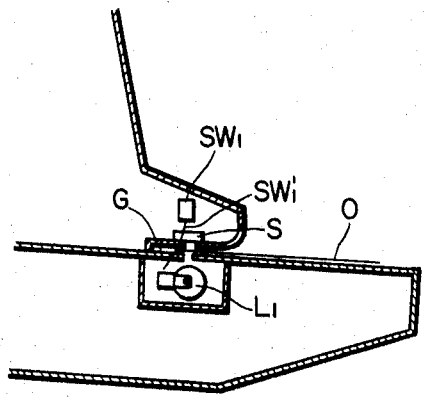
FIG. 3 is a schematic sectional view, showing a measuring portion of the automatic exposure control device.

Referring to FIG. 3, showing the mechanical arrangement of the measuring means, a gap G is provided to allow insertion of an original O, whose transmittivity is to be measured. The measuring light source lamp $L_1$ and the photosensitive element S are located on opposite sides of the gap G, for instance above and below thereof, respectively. In this particular embodiment, the microswitch $SW_1$ mounted above the gap G, and an actuator $SW_1'$ is disposed in the gap G, so that when the original O covers the measuring light source lamp $L_1$, the microswitch $SW_1$ is closed. If the light beams for measuring the transmittivity of the original can be taken from a light source for copying, the separate light source lamp $L_1$ for the measurement can be dispensed with.

The operation of the exposure control device of the aforesaid construction will now be described, in further detail. Referring to FIG. 3, when the original to be copied is properly inserted into the gap G of the measuring means of the exposure control device, the tip of the original depresses the actuator $SW_1'$, so as to energize the microswitch $SW_1$. Thereby, referring to FIG. 2, the magnetic clutch CL is actuated to engage the input and the output shafts thereof, and at the same time, the measuring light source lamp $L_1$ (FIGS. 1 and 3) is turned on. As can best be seen in FIG. 3, the lamp $L_1$ emanates light beams penetrating through the original O toward the photosensitive element S. Referring back to FIG. 1, the resistance value $r_s$ of the photosensitive element S varies in accordance with the intensity of the light beams arriving thereat. The actuation of the DC relay $RY_1$ is delayed from the turning-on of the microswitch $SW_1$ by the time delay circuit consisting of the resistor $R_1$ and the capacitor $C_1$, by a time period at least sufficient for allowing the lamp $L_1$ to become stable and the resistance value $r_s$ of the photoelectric element S becomes constant with the thus stabilized light source $L_1$. Upon actuation of the relay $RY_1$, its normally open contact $1c$ is closed, to apply an AC driving voltage to terminals X, X'. Thus, the power transformer T is energized, so that the bridge circuit B and the amplifier A are actuated.

As a first case, let it be assumed that $r_s \geqq (r_a/r_2)r_c$ when the transmittivity of the original O is measured. Under such conditions, the $RY_2$ is not energized, and hence both AC relays $RY_3$ and $RY_4$ remain deenergized. The circuit of the pilot lamp $L_2$ is complete, which traces from one AC power source terminal X, through the lamp $L_2$, the normally closed contact $3a'$ to $3b'$ of the relay $RY_3$, and another normally closed contact $4b'$ to $4a'$ of the $RY_4$, and to the other AC power source terminal X'. Thus, the pilot lamp $L_2$ is turned on.

The reversible motor CM is actuated by a circuit extending from the AC terminal X, through a normally closed contact $3a$ to $3b$ of the $RY_3$, the reversible motor windings, the normally closed contact $3a'$ to $3b'$ of the $RY_3$ and the normally closed contact $4b'$ to $4a'$ of the $RY_4$, to the other AC terminal X'. Accordingly, the reversible motor CM rotates to increase the resistance value $r_c$ of the potentiometer $VR_2$ and to reduce the output voltage from the variable output voltage transformer SR. Thereby, the revolving speed of the DC motor MM is reduced.

When the resistance value $r_c$ of the potentiometer $VR_2$ further increases and various resistances of the bridge circuit B satisfy the relationship of $r_s < (r_a/r_2)r_c$, the DC relay $RY_2$ is actuated. Thereby, the normally open contacts $2c$ and $2c'$ of the $RY_2$ are closed, to energize the AC relays $RY_3$ and $RY_4$, respectively. The normally closed contact $3b'$ of the relay $RY_3$ is now opened, so that the pilot lamp $L_2$ is turned off momentarily, and then turned on again through the newly closed circuits through contacts $3a'$, $3c'$, $4$ and $4a'$ of the relays $RY_3$ and $RY_4$. Similarly, the reversible motor is deenergized momentarily, but resumes its rotation in the opposite direction, to increase the revolving speed of the DC motor MM.

When various resistances of the bridge circuit B satisfy the relation of $r_s = (r_a/r_2)r_c$, in a well stabilized manner, the DC relay $RY_2$ is turned off again, to deenergize the AC relay $RY_3$. The other AC relay $RY_4$, however, remains energized by the self-hold circuit through the contact $4a$ to $4c$ thereof. Accordingly, in the reversible motor circuit, the normally closed contact $3a'$ to $3b'$ of the relay $RY_3$ is closed, but the normally closed contact of the relay $RY_4$ remains open, so that the reversible motor CM stops and the pilot lamp $L_2$ is turned off. Thus, the variable output voltage transformer SR stops at such position that the DC motor rotates at a speed corresponding to the resistance value $r_s$ of the photosensitive element S. In other words, a proper degree of exposure for the transmittivity of the original O is achieved.

Upon turning off of the pilot lamp $L_2$, the original O is removed from the gap G, to turn off the microswitch $SW_1$. Accordingly, both the measuring light source lamp $L_1$ and the magnetic clutch CL are deenergized.

With the magnetic clutch CL disengaged, if it is necessary to modify the revolving speed of the DC motor MM, such modification can be done by manually turning the dial D.

Then, as a second case, let it be assumed that upon measuring the transmittivity of the original O, the following relationship is established in the bridge circuit B.

$r_s < (r_a/r_2)r_c VR$

In this case, the DC relay $RY_2$ is energized immediately, so that the proper degree of exposure can be set as a suitable revolving speed of the DC motor MM, in the manner as described above.

As a third case, let it be assumed that after an original O is copied, by setting the proper degree of exposure therefor, the same original is inserted into the gap G for setting a new degree of exposure. In this case, the potentiometer $VR_2$ has the resistance value $r_c$ satisfying the following relationship.

$r_s = (r_a/r_2)r_c$

Accordingly, the DC relay $RY_2$ remains deenergized, so that the same setting of the degree of exposure can be resumed, in the same manner as described above referring to the first case.

The amplifier A usually has a dead zone. For instance, when the resistance value $r_c$ of the potentiometer is very small and various resistances in the bridge circuit B assume the relationship of $r_s > (r_a/r_2)r_c$, the DC relay $RY_2$ remains deenergized, and the $RY_2$ is not energized when the relationship of $r_s = (r_a/r_2)r_c$ is satisfied, but it is energized only when the resistance value $r_c$ exceeds the above relationship by a small amount $\Delta r_c$. Similarly, when the value of $r_c$ decreases from a range of $r_s < (r_a/r_2)r_c$, where the relay $RY_2$ remains energized, the relay $RY_2$ is not deenergized at the relationship of $r_s = (r_a/r_2)r_c$, but it is deenergized only when the value of $r_c$ decreases in excess of the last mentioned relation by a small amount $\Delta r_c'$. In other words, there is a dead zone of the width $(\Delta u_c + aFu_c')$. However, it was confirmed through experiments that the exposure control device, according to the present invention, functioned satisfactorily for all the aforesaid three cases.

Furthermore, in the illustrated embodiment, the reversible motor stops from one direction only. More particularly, the reversible motor stops only when the resistance value $r_c$ decreases from the range of $r_s < (r_a/r_2)r_c$, with the relay $RY_2$ energized, into the range of $r_s > (r_a/r_2)r_c$, so that the $RY_2$ is deenergized from the energized condition. Thus, the effects of such dead zone are limited only to a certain direction by a certain limited amount. Accordingly, such effects can be easily compensated for.

The reason for using a combination of the three resistors $R_a$, $R_b$, $R_c$ combined with a selecting switch $SW_2$ is to provide for different sensitivities of the photosensitive copying medium. In the foregoing, the description is made referring to only the resistor $R_a$. It is apparent to those skilled in the art that similar operation can be made for different resistance value $r_b$ or $r_c$, instead of the aforesaid value $r_a$, so that the revolving speed of the DC motor MM is set at a value related to the resistance $r_b$ or $r_c$ rather than $r_a$.

In addition, the variable output voltage transformer SR of the aforesaid embodiment can be replaced with a semiconductor circuit, such as a transistorized circuit or a silicon controlled rectifier circuit, for controlling the revolving speed of the DC motor MM.

It should be noted here that similar exposure control can be accomplished by controlling the intensity of light beams for copying, rather than controlling the feeding speed of the original and the photosensitive copying medium. For such purposes, the variable output voltage transformer SR and the DC motor MM of the illustrated embodiment can be replaced with a suitable light source control means, for instance, a control means comprising semiconductors or magnetic amplifiers.

Furthermore, the automatic exposure control device of the present invention can be applied to a copying machine using reflection from the original O. In this case, the measuring means should be so modified as to determine the reflectance of the original by rearranging the measuring light source lamp $L_1$ and the photosensitive element S.

As described in the foregoing, according to the present invention, there is provided an automatic exposure control device for providing a proper degree of exposure to the photosensitive medium, by determining the transmittivity or reflectance of each original to be copied.

Salient features of the device of the present invention are as follows.

1. Proper and accurate exposure for different kinds of originals can be achieved. The exposure for copying has heretofore been determined only by experience, and it has not been accurate. Thus, failure in copying is eliminated by the device of the invention, to save waste of photosensitive copying medium, such as photosensitive copying papers. In addition, the quality of the copy can be improved.
2. The proper degree of exposure is set automatically simply by placing the original on the measuring portion of the device. There is no need for providing switch for turning over between automatic and manual or the like. Thus, the device can be made very simple in construction and operation.
3. Danger of misoperation is minimized, because upon completion of setting the proper exposure, an indication is given by signal lamp means. Besides, in a preferred embodiment, the selected revolving speed of a motor for feeding the original and photosensitive copying medium is indicated, so that fine adjustment of the exposure can be made manually.
4. Effects of dead zones in the bridge circuit and amplifier of the exposure control device can be easily compensated for.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. An automatic exposure control device comprising a light source, a bridge circuit including a variable resistance element and a photosensitive element disposed near said light source, said photosensitive element presenting a resistance determined by the optical properties of an original to be copied, an exposure mechanism for exposing a photosensitive copying medium to light, a reactance means coupled in circuit with said exposure mechanism and having a value which is variable and is determinative of the quantity of light exposed to the copying medium by said exposure mechanism, and a reversible motor mechanically coupled to said reactance means and to said variable resistance element for varying the values thereof, said reversible motor being electrically coupled to said bridge circuit and responsive to an imbalance therein to change the values of said variable resistance element and said reactance means until balance of said bridge circuit is achieved.

2. The automatic exposure control device set forth in claim 1, and further comprising means to indicate that the bridge circuit is in balance, so that a user will be apprised of the fact that the memory element has a value to cause the exposure mechanism to expose the photosensitive copying medium to the proper quantity of light.

3. The automatic exposure control device set forth in claim 1, wherein the resistance of said photosensitive element is controlled by the transmittivity of the original.

4. The automatic exposure control device set forth in claim 1, wherein the resistance of said photosensitive element is controlled by the transmittivity of the original, and said exposure mechanism controls the feeding speed of the original.

5. The automatic exposure control device set forth in claim 1, wherein the resistance of said photosensitive element is in position to be controlled by the reflectance of the original.

6. The automatic exposure control device set forth in claim 1, wherein said exposure mechanism controls the brightness of a light source for copying.

7. The automatic exposure control device set forth in claim 1, and further comprising a relay for operating said motor and being actuated by said bridge circuit for a given polarity of imbalance therein.

8. The automatic exposure control device set forth in claim 1, wherein said reactance means comprises a variable output voltage transformer having a movable tap mechanically coupled to said reversible motor.

9. The automatic exposure control device set forth in claim 1 and further comprising a relay having a pair of contacts and a winding, said contacts coupling a power source to said bridge circuit, insertion of the original between said light source and said photosensitive element being operative to provide current through said winding to close said contacts for applying the power from the power source to said bridge circuit.